United States Patent [19]

Togai

[11] Patent Number: 5,896,839
[45] Date of Patent: Apr. 27, 1999

[54] CONTROL APPARATUS FOR AN INTERNAL COMBUSTION ENGINE

[75] Inventor: Kazuhide Togai, Takatsuki, Japan

[73] Assignee: Mitsubishi Jidosha Kogyo Kabushiki Kaisha, Tokyo, Japan

[21] Appl. No.: 08/917,869

[22] Filed: Aug. 27, 1997

[30] Foreign Application Priority Data

Aug. 27, 1996 [JP] Japan ................................. 8-225719

[51] Int. Cl.$^6$ ........................................... F02D 41/22
[52] U.S. Cl. .................. 123/295; 123/399; 123/406.13; 123/479; 123/568.16; 123/690
[58] Field of Search .......................... 123/295, 305, 123/396, 397, 399, 406.13, 479, 568.16, 568.21, 690; 701/102, 104, 107

[56] References Cited

U.S. PATENT DOCUMENTS

| | | | |
|---|---|---|---|
| 4,641,622 | 2/1987 | Murakami | 123/479 |
| 4,704,685 | 11/1987 | Martinsons et al. | 123/479 X |
| 4,748,567 | 5/1988 | Sumizawa et al. | 123/479 X |
| 4,920,939 | 5/1990 | Gale | 123/399 |
| 5,150,698 | 9/1992 | Kohler et al. | 123/479 X |
| 5,305,723 | 4/1994 | Kadota | 123/479 |

*Primary Examiner*—Tony M. Argenbright

[57] ABSTRACT

A control apparatus of an internal combustion engine includes an electronic control unit which determines whether a throttle valve opening sensor is normal or faulty in accordance with an output from the sensor. If the throttle valve opening sensor operates normally, a target air-fuel ratio is set in accordance with the output of the sensor. On the other hand, if the throttle valve opening sensor is in trouble, the control unit sets the target air-fuel ratio to a ratio equal to or close to the stoichiometric air-fuel ratio in accordance with the output of an intake air amount sensor, whereby a stable operation of the internal combustion engine is ensured.

28 Claims, 5 Drawing Sheets

5,896,839

1

CONTROL APPARATUS FOR AN INTERNAL COMBUSTION ENGINE

BACKGROUND OF THE INVENTION

1. Field of the Invention

This invention relates to a control apparatus for an internal combustion engine, and more particularly, to a control apparatus capable of variably controlling the air-fuel ratio of an air-fuel mixture supplied to an engine.

2. Description of the Related Art

Recently, gasoline engines have become commercially practical, which can be driven with a lean air-fuel ratio leaner than the stoichiometric air-fuel ratio to improve the fuel efficiency.

In the lean air-fuel ratio operation for which a small amount of fuel relative to an intake air amount is set, a problem may occur such that ignitability for fuel around a spark plug is worsened, as compared to a case where the engine is driven with the stoichiometric air-fuel ratio. Thus, efforts have been made to improve the ignitability by changing configurations of the combustion chamber, intake port and the like or by changing a fuel injection system, so that an air-fuel mixture having a dense fuel concentration is locally collected in the vicinity of the spark plug.

In this case, the air-fuel ratio throughout a cylinder can be made lean and the air-fuel ratio can be controlled freely in a wide range.

To control the air-fuel ratio freely, however, the fuel injection amount, ignition timing and the like must be controlled smoothly and accurately depending on an engine operating state and its change. Further, fuel injection control and ignition timing control must be carried out, so as to suppress a change in the engine operating state caused by an increase or decrease in air-fuel ratio.

In this respect, a target air-fuel ratio and target ignition timing are determined in a manner accurately and immediately responding to the throttle opening degree, engine rotation speed, and their changes, in accordance with a throttle opening degree θTH detected by a throttle valve opening sensor (TPS) and engine rotation speed Ne detected by an engine speed sensor, for instance.

Usually, the throttle valve opening sensor is mounted to the intake pipe of an engine and is hence caused to vibrate during the engine operation. Further, the throttle valve opening sensor has a movable portion which operates in response to the opening and closing actions of the throttle valve. As a result, the movable portion may be worn with use. If such a deterioration becomes noticeable with passage of time, the throttle valve opening sensor may be faulty.

If the throttle valve opening sensor, more generally, parameter detecting means for detecting an operating state of an accelerator member (engine speed adjusting member) such as an accelerator pedal, becomes faulty and operates abnormally, then the target air-fuel ratio and target ignition timing cannot be determined properly in accordance with an output signal of the sensor, so that the air-fuel ratio or fuel injection amount and the ignition timing cannot be controlled adequately. In such a case, the operating state of the engine becomes unstable so that drivability may be worsened.

SUMMARY OF THE INVENTION

An object of the present invention is to provide a control apparatus for an internal combustion engine, which is capable of maintaining a stabilized engine operating state even if there occurs a failure in a sensor for detecting a parameter which is used to set a fuel injection amount.

According to the present invention, there is provided a control apparatus for an internal combustion engine having a speed adjusting member for engine speed adjustment and a fuel injection device for injecting fuel in a suitable quantity to an engine operating state. The control apparatus comprises: a parameter detecting means for detecting a first parameter indicative of the engine operating state and varying with a change in an operating state of the speed adjusting member and for generating an output indicative of the first parameter thus detected; a first output-related value setting means for setting a target output-related value, affecting engine operation, in accordance with at least the output of the parameter detecting means; a second output-related value setting means for setting the target output-related value in accordance with a second parameter, other than the first parameter, indicative of the engine operating state; a fuel injection control means for controlling the fuel injection device in accordance with the target output-related value set by the first or second output-related value setting means; and a failure detecting means for detecting a failure in the parameter detecting means.

When no failure in the parameter detecting means is detected by the failure detecting means, the fuel injection control means controls the fuel injection device in accordance with mainly the target output-related value set by the first output-related value setting means.

When a failure in the parameter detecting means is detected by the failure detecting means, the fuel injection control means controls the fuel injection device in accordance with the target output-related value set by the second output-related value setting means.

The present invention is advantageous in that a target output-related value suited to the engine operating state can be set in accordance with a second parameter which is different from an output (first parameter), utilized for the setting of a target output-related value, of the parameter detecting means, when the parameter detecting means is in trouble. As a result, an appropriate fuel injection control can be performed in accordance with the target output-related value thus set, thereby maintaining the internal combustion engine in a stabilized operating state. This makes it possible to prevent a degraded drivability of the engine which would be otherwise caused when the parameter detecting means is in trouble.

Preferably, the second output-related value setting means sets the target output-related value to such a value as to make a target air-fuel ratio substantially equal to the stoichiometric air-fuel ratio.

With this arrangement, upon occurrence of a failure in the parameter detecting means (e.g., throttle sensor) for generating an output indicating a first parameter which in turn indicates the operating state of the speed adjusting member (e.g., accelerator pedal or throttle valve) of the engine and hence which indicates the engine operating state, the fuel injection control is carried out in accordance with the target output-related value set by the second output-related value setting means in such a manner that a target air-fuel ratio becomes the substantially stoichiometric air-fuel ratio. As a result, the engine operation can be stabilized. Further, the emission of harmful gas components can be suppressed in case that the internal combustion engine is of a type having an exhaust system provided with a three-way catalyst.

Preferably, the target output-related value is a target air-fuel ratio, or a required fuel injection amount for achieving the target air-fuel ratio, or a driving time of the fuel injection device corresponding to the required fuel injection amount.

In this case, the engine output suited to the engine operating state can be obtained. Even when the parameter detecting means becomes faulty, the engine output can be stabilized.

Preferably, the second output-related value setting means uses intake air amount or exhaust gas component as the second parameter.

With this preferred apparatus, even if the parameter detecting means for generating an output indicative of the first parameter, which indicates the operating state of the speed adjusting member or of the engine, is in trouble, the target output-related value can be set appropriately in accordance with an intake air amount or an exhaust gas component which serves as the second parameter and which properly indicates the engine operating state, whereby the fuel injection or engine operation can be carried out appropriately.

Preferably, the control apparatus of this invention further comprises: a first ignition timing setting means for setting a target ignition timing in accordance with at least the output of the parameter detecting means; a second ignition timing setting means for setting the target ignition timing in accordance with the second parameter; and an ignition timing control means for controlling a spark plug in accordance with the target ignition timing set by the first or second ignition timing setting means, said spark plug being provided in the internal combustion engine for igniting fuel supplied to a combustion chamber of the internal combustion engine.

When no failure in the parameter detecting means is detected by the failure detecting means, the ignition timing control means controls the spark plug in accordance with mainly the target ignition timing set by the first ignition timing setting means. On the other hand, when a failure in the parameter detecting means is detected by the failure detecting means, the ignition timing control means controls the spark plug in accordance with the target ignition timing set by the second ignition timing setting means.

With this preferred apparatus, even when the parameter detecting means for detecting the first parameter is faulty, the target ignition timing can be set appropriately in accordance with the second parameter which is different from the first parameter, and the ignition timing control can be carried out in accordance with the thus set an appropriate target ignition timing. As a result, a stabilized engine operating state can be maintained.

Preferably, the parameter detecting means is comprised of a pedal depression amount detecting means for detecting a depression amount, as the first parameter, of an accelerator pedal and for generating an output indicative of the accelerator depression amount thus detected, said accelerator pedal being mounted, as the speed adjusting member, in a vehicle on which the internal combustion engine is mounted, and being operable by a driver. Alternatively, the parameter detecting means is comprised of a throttle valve opening degree detecting means for detecting an opening degree, as the first parameter, of a throttle valve and for generating an output indicative of the detected opening degree of the throttle valve, said throttle valve being provided in an intake passage of the internal combustion engine and being operable in association with or independently of an operation of the accelerator pedal.

With this preferred arrangement, the operating state (first parameter) of the speed adjusting member can be detected properly by the parameter detecting means. The fuel injection control can be made appropriately based on the properly set target output-related value at the time when the detecting means operates normally.

In the preferred apparatus in which the target air-fuel ratio, the required fuel injection amount, or the driving time of the fuel injection device is employed as the target output-related value, preferably, the control apparatus comprises an air-fuel ratio mode selecting means for selecting, in accordance with at least the output of the parameter detecting means, either a first air-fuel ratio mode where the target air-fuel ratio, as the target output-related value, is set to a lean air-fuel ratio or a second air-fuel ratio mode where the target air-fuel ratio is set to a substantially stoichiometric air-fuel ratio.

When the first air-fuel ratio mode is selected by the air-fuel ratio mode selecting means, the fuel injection amount control means controls the fuel injection device in accordance with the target air-fuel ratio set by the first output-related value setting means. On the other hand, when the second air-fuel ratio mode is selected, the fuel injection amount control means controls the fuel injection device in accordance with the target air-fuel ratio set by the second output-related value setting means.

Alternatively, the control apparatus further comprises an injection mode selecting means for selecting, in accordance with at least the output of the parameter detecting means, either a first injection mode where the target air-fuel ratio, as the target output-related value, is set to a lean air-fuel ratio or a second injection mode where the target air-fuel ratio is set to a substantially stoichiometric air-fuel ratio. The fuel injection device is arranged to inject the fuel directly into a combustion chamber of the internal combustion engine.

When the first injection mode is selected by the injection mode selecting means, the fuel injection amount controlling means controls the fuel injection device, so as to inject the fuel mainly in a compression stroke of the internal combustion engine in accordance with the target air-fuel ratio set by the first output-related value setting means. On the other hand, when the second injection mode is selected, the fuel injection amount controlling means controls the fuel injection device, so as to inject the fuel mainly in intake stroke of the internal combustion engine in accordance with the target air-fuel ratio set by the second output-related value setting means.

With these preferred arrangements, if a failure in the parameter detecting means is detected and hence the second air-fuel ratio mode or the second injection mode is selected, then the target air-fuel ratio is set to the substantially stoichiometric air-fuel ratio. In case that the parameter detecting means operates normally, the internal combustion engine is sometimes operated with a substantially stoichiometric air-fuel ratio. Thus, the setting of the target air-fuel ratio at the time of failure in the parameter detecting means can be carried out in the same manner as in the case where the engine is operated with the substantially stoichiometric air-fuel ratio during the normal operation of the detecting means. In other words, the control content relating to the setting of the target air-fuel ratio can be simplified, as a whole, in these two preferred arrangements.

According to the latter arrangement provided with the injection mode selecting means, among the two arrangements, the first injection mode can be selected as required, at the time when the parameter detecting means operates normally. In the first injection mode, a stratified-charge lean-combustion operation of the engine is carried out to permit the engine to operate with a lean air-fuel ratio and to produce a large output. As a consequence, the fuel efficiency can be improved without causing a substantial drop in the engine output. At the time of failure in the parameter detecting means, on the other hand, the second injection mode can be selected in which the fuel injection control can be made under relatively relaxed requirements in respect of fuel injection timing, ignition timing, and the like. This permits a stabilized engine operation to be attained.

In each of the above two arrangements, preferably, the control apparatus further comprises an intake air amount control means for controlling an amount of intake air introduced into a combustion chamber of the internal combustion engine. When the first air-fuel ratio mode or the first injection mode is selected by the air-fuel ratio mode selecting means or the injection mode selecting means, the intake air amount control means controls the intake air amount in accordance with the output of the parameter detecting means. When the second air-fuel ratio mode or the second injection mode is selected, the intake air amount control means stops controlling the intake air amount.

With this preferred apparatus, the intake air amount control is carried out while the engine operates with a lean air-fuel ratio, whereas such a control is halted if the engine operates with the substantially stoichiometric air-fuel ratio. Consequently, the engine output can be properly controlled in both the lean air-fuel ratio engine operation at the time of normal operation of the parameter detecting means and the stoichiometric air-fuel ratio engine operation at the time of occurrence of a failure in the parameter detecting means.

Preferably, the internal combustion engine includes a combustion chamber, an exhaust system, and an exhaust gas recirculation device for recirculating exhaust gas from the exhaust system to the combustion chamber. When the failure detecting means detects a failure in the parameter detecting means, the air-fuel ratio mode selecting means or the injection mode selecting means selects the second air-fuel ratio mode or the second injection mode, and the exhaust gas recirculation device stops recirculating the exhaust gas.

With this preferred apparatus, when a failure occurs in the parameter detecting means, the engine operates with the substantially stoichiometric air-fuel ratio, and the exhaust gas recirculation which may cause a drop in the engine output is halted, so that a more stabilized engine operating state can be achieved.

In the preferred arrangement having the air-fuel ratio mode selecting means, preferably, the air-fuel ratio mode selecting means is operable to select a third air-fuel ratio mode in which the target air-fuel ratio is set to a predetermined air-fuel ratio between the lean air-fuel ratio relating to the first air-fuel ratio mode and the substantially stoichiometric air-fuel ratio relating to the second air-fuel ratio mode. When a failure in the parameter detecting means is detected by the failure detecting means, the air-fuel ratio mode selecting means selects the second or third air-fuel ratio mode. The fuel injection control means controls the fuel injection device so that the target air-fuel ratio becomes the substantially stoichiometric air-fuel ratio relating to the second air-fuel ratio mode or the predetermined air-fuel ratio relating to the third air-fuel ratio mode.

In the preferred embodiment having the injection mode selecting means, preferably, the injection mode selecting means is operable to select a third injection mode in which the target air-fuel ratio is set to a predetermined air-fuel ratio between the lean air-fuel ratio relating to the first injection mode and the substantially stoichiometric air-fuel ratio relating to the second injection mode and in which the fuel injection is carried out mainly in an intake stroke of the internal combustion engine. When a failure in the parameter detecting means is detected by the failure detecting means, the injection mode selecting means selects the second or third injection mode. The fuel injection control means controls the fuel injection device so that the target air-fuel ratio becomes the substantially stoichiometric air-fuel ratio relating to the second injection mode or the predetermined air-fuel ratio relating to the third injection mode.

With the above two preferred arrangements, when the parameter detecting means is in trouble, it is possible to select the second or third air-fuel ratio mode or the second or third injection mode in which the fuel injection control can be carried out under relatively relaxed control requirements, as compared to the first air-fuel ratio mode and the first injection mode, thereby attaining a stabilized engine operation.

DETAILED DESCRIPTION

A control apparatus for an internal combustion engine according to an embodiment of the present invention will be described with reference to the accompanying drawings.

Figure 1:
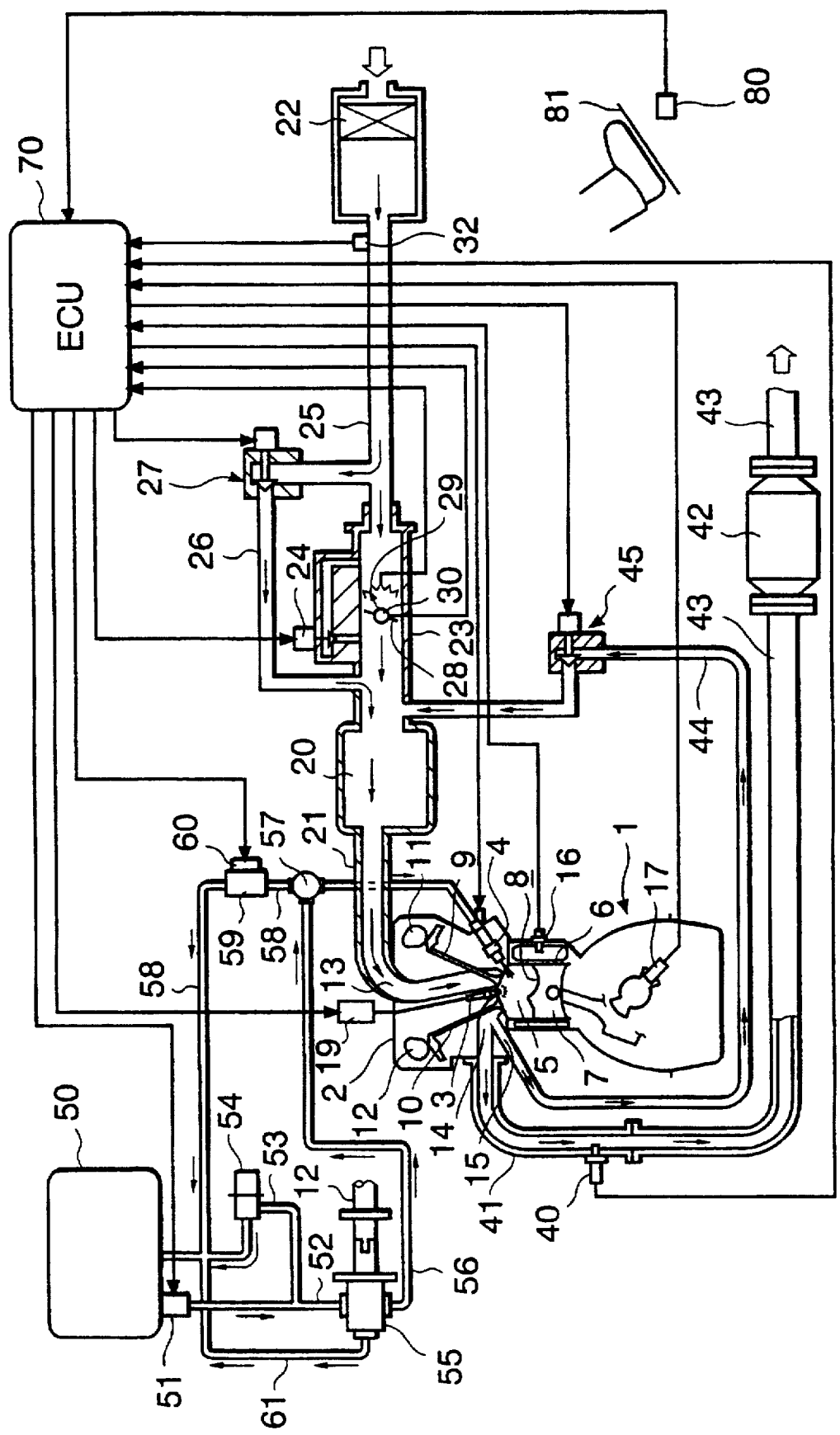
FIG. 1 is a schematic construction diagram showing a control apparatus for an internal combustion engine according to an embodiment of the present invention.

Referring to FIG. 1, reference numeral 1 denotes an engine (in this embodiment, in-cylinder injection type in-line 4-cylindered gasoline engine) which is capable of performing a combustion operation under a lean air-fuel ratio. This in-cylinder injection type engine has its combustion chamber, intake system, exhaust gas recirculation (EGR) system and the like which are designed specially for in-cylinder injection. Further, this engine is so designed as to be operable with a rich air-fuel ratio, stoichiometric air-fuel ratio AFs, lean air-fuel ratio and the like. As will be described in detail later, the in-cylinder injection type engine 1 is designed so that the air-fuel ratio of an air-fuel mixture supplied thereto can be changed in a lean air-fuel ratio range (e.g., 30–40).

The engine 1 has a cylinder head 2 provided with a solenoid-operated fuel injection valve 4 as well as a spark plug 3, for each cylinder, so that fuel is injected directly into a combustion chamber 5. A piston 7 is vertically slidably disposed in a cylinder 6 and is formed at a tope surface with a hemispherical cavity 8 located at a surface region which is reached by fuel injected from the fuel injection valve 4 in the latter half of compression stroke. The compression ratio of the engine 1 is set to be higher (for example, about 12) than that of a conventional manifold-injection type engine. A DOHC four-valve system is used as a valve driving mechanism. Intake-side and exhaust-side camshafts 11 and 12 are rotatably held in the upper portion of the cylinder head 2 for driving intake and exhaust valves 9 and 10, respectively.

The cylinder head 2 is formed with intake ports 13 each of which extends substantially upright between the two camshafts 11 and 12, so that an intake air flow having passed through the intake port 13 can generate, in the combustion chamber 5, a reverse tumbling flow which is opposite in direction to an ordinary tumbling flow. That is, the intake air flow swivels clockwise in the combustion chamber 5 in FIG. 1. Exhaust ports 14, like those of a conventional engine, extend substantially in the horizontal direction. A large-diameter exhaust gas recirculation port or EGR port 15 diverges diagonally downward from an exhaust port 14 associated therewith.

In FIG. 1, reference numeral 16 denotes a water temperature sensor for detecting cooling water temperature Tw. Numeral 17 denotes a vane-type crank angle sensor that outputs a crank angle signal SGT in predetermined crank positions (e.g., 5° BTDC and 75° BTDC) in each cylinder. The crank angle sensor 17 is capable of detecting an engine rotation speed Ne. Numeral 19 denotes an ignition coil that delivers a high voltage to the spark plug 3. Either one of the camshafts which rotate at half the rotation speed of the crankshaft is fitted with a cylinder discriminating sensor (not shown) for outputting a cylinder discriminating signal SGC, whereby the cylinder for which the crank angle signal SGT is outputted is discriminated.

The intake ports 13 are connected, through an intake manifold 21 having a surge tank 20, with an intake pipe 25 which is provided with an air cleaner 22, a throttle body 23 and an airflow sensor (intake air amount detecting means) 32. Numeral 24 denotes a stepper motor type first air bypass valve (#1ABV) disposed within a bypass passage formed in the intake pipe 25, bypassing a throttle valve 28 which will be described later.

The intake pipe 25 is connected to a large-diameter air bypass pipe 26 through which intake air is introduced into the intake manifold 21, bypassing the throttle body 23. The bypass pipe 26 is provided with a large-sized second air bypass valve (#2ABV) 27 of a linear-solenoid type. The air bypass pipe 26 has a flow area substantially equal to that of the intake pipe 25 (at least about half the flow area of the intake pipe 25), so that an amount of air required for the engine 1 to operate at low and medium speed ranges can flow when the #2ABV 27 is fully open (air intake control means).

The throttle body 23 comprises a butterfly-type throttle valve 28 (more generally, engine speed adjusting member) for opening and closing the flow passage of the throttle body, a throttle position sensor (hereinafter referred to as TPS) 29 which is an acceleration detecting means or parameter detecting means for detecting an opening degree (throttle opening θTH serving as a first parameter) of the throttle valve 28, and an idle switch 30 for detecting a fully-closed state of the throttle valve 28 indicating that the engine 1 runs idle. In actual, a throttle voltage VTH indicative of the throttle opening θTH is delivered from the TPS 29, so that the throttle opening θTH is recognized based on the throttle voltage VTH.

The airflow sensor 32 for detecting an intake air amount Qa is comprised of a Karman-vortex airflow sensor, for example. Alternatively, the intake air amount Qa may be obtained from an intake pipe pressure Pb detected by a boost pressure sensor, which is attached to the surge tank 20. That is, the intake air amount Qa can be obtained based on a difference between the intake pipe pressure Pb and the atmospheric pressure, and the engine rotation speed Ne.

The exhaust port 14 is connected, through an exhaust manifold 41 fitted with an $O_2$ sensor 40, to an exhaust pipe 43 which is provided with a three-way catalyst 42, muffler (not shown) and the like. Also, the EGR port 15 is connected through an EGR pipe 44 to the intake pipe 25 at a location located on the side upstream of the intake manifold 21. The EGR pipe 44 is provided with an EGR valve 45 of stepper-motor type.

A fuel tank 50 is provided in the rear of a vehicle body (not shown). Fuel stored in the fuel tank 50 is sucked up by an electric-driven low-pressure fuel pump 51 and is delivered toward the engine 1 through a low-pressure feed pipe 52. The pressure of the fuel in the low-pressure feed pipe 52 is adjusted to a relatively low pressure (low fuel pressure) by means of a first fuel pressure regulator 54 which is inserted in a return pipe 53. The fuel delivered toward the engine 1 is fed to the fuel injection valves 4 through a high-pressure feed pipe 56 and a delivery pipe 57 by means of a high-pressure fuel pump 55, which is attached to the cylinder head 2.

The high-pressure fuel pump 55 is, for example, of a swash plate piston type and driven by the exhaust side camshaft 12. The pump 55 is capable of generating a pressure of 5 Mpa-7 Mpa or more even when the engine 1 runs idle. The pressure of the fuel in the delivery pipe 57 is adjusted to a relatively high pressure (high fuel pressure) by means of a second fuel pressure regulator 59 which is inserted in the return pipe 58.

Referring to FIG. 1, reference numeral 60 denotes a solenoid-operated fuel pressure selector valve which is attached to the second fuel pressure regulator 59. The fuel pressure selector valve 60 relieves the fuel when it is ON, so that the pressure of fuel in the delivery pipe 57 can be lowered to a low fuel pressure. Numeral 61 denotes a return pipe for returning part of fuel used for lubrication or cooling of the high pressure fuel pump 55 to the fuel tank 50.

An electronic control unit (ECU) 70 is installed in a passenger compartment of a vehicle, and comprises an I/O unit, storage units (ROM, RAM, BURAM, etc.) for storage of control program, control map and the like, a central processing unit (CPU), timer counters and the like. The ECU 70 serves for general control of the engine 1.

The aforementioned various sensors are connected to the input side of the ECU 70 which receives pieces of detection information from the aforementioned various sensors. The ECU 70 determines an ignition timing, EGR gas introduction amount, etc., as well as a fuel injection mode and fuel injection quantity based on the detection information, and drivingly controls the fuel injection valve 4, ignition coil 19, EGR valve 45 and the like. A number of switches, sensors and the like (not shown) as well as the aforementioned sensors are connected to the input side of the ECU 70, although a description of which is omitted. Various warning lamps, devices and the like are connected to the output side of the ECU 70.

Next, an operation of the control apparatus of the internal combustion engine having the above-described construction, that is, contents of engine control will be described.

If the ignition key is turned on when the engine is cold, the ECU 70 switches the low-pressure fuel pump 51 and the fuel-pressure selector valve 60 on, so that the fuel injection valves 4 are supplied with fuel at low pressure.

When an operator turns the ignition key, the engine 1 is cranked by a self starter (not shown) and at the same time, fuel injection is initiated under the control of the ECU 70. At this time, the ECU 70 selects a first-term injection mode (that is, intake-stroke injection mode) and injects fuel so as to attain a relatively rich air-fuel ratio. The reason why such an injection mode is selected resides in that occurrence of misfire or emission of unburnt fuel (HC) is unavoidable if the fuel is injected at a second-term injection mode (that is, compression-stroke injection mode), because the evaporation rate of fuel is low when the engine is cold. At the start of the engine, the ECU 70 substantially fully closes the #2ABV 27. Thus, the intake air is supplied to the combustion chamber 5 through a gap around the throttle vale 28 and a bypass passage in which the #1ABV 24 is disposed. The #1ABV 24 and the #2ABV 27 are controlled by the ECU 70 in a unified way. The opening degrees of these valves are determined depending on required amounts of intake air (bypass air) to be introduced into the engine, bypassing the throttle valve 28.

When the engine 1 starts an idle operation upon completion of the engine start, the high-pressure fuel pump 55 initiates a rated discharge operation. In response to this, the ECU 70 turns off the fuel pressure selector valve 60 and supplies the fuel at high pressure to the fuel injection valves 4. At this time, a required fuel injection amount is obtained from a relation between fuel pressure in the delivery pipe 57 (fuel pressure set by the second fuel pressure regulator 59) and valve opening time (output-related value) of the fuel injection valve 4 concerned, or from a relation between fuel pressure obtained by a fuel pressure sensor (not shown) for detecting fuel pressure in the delivery pipe 57 and valve opening time.

Until the cooling water temperature Tw increases to a predetermined value, the ECU 70 selects the first-term injection mode and injects the fuel so as to secure a rich air-fuel ratio, as in the case of the engine start. The idle speed control is carried out by means of the #1ABV 24 in accordance with a variable load, acting on the engine, of auxiliary apparatuses such as an air conditioner. If a predetermined number of cycles passes so that an $O_2$ sensor 40 is activated, the ECU 70 starts an air-fuel ratio feedback control which is effected in accordance with the output voltage of the $O_2$ sensor 40, whereby harmful exhaust gas components are removed by the three-way catalyst 42.

The in-cylinder injection type engine secures a high response and accuracy in fuel injection control even when the engine is cold, because no fuel droplet adheres to a wall face of the intake pipe 13.

Figure 2:
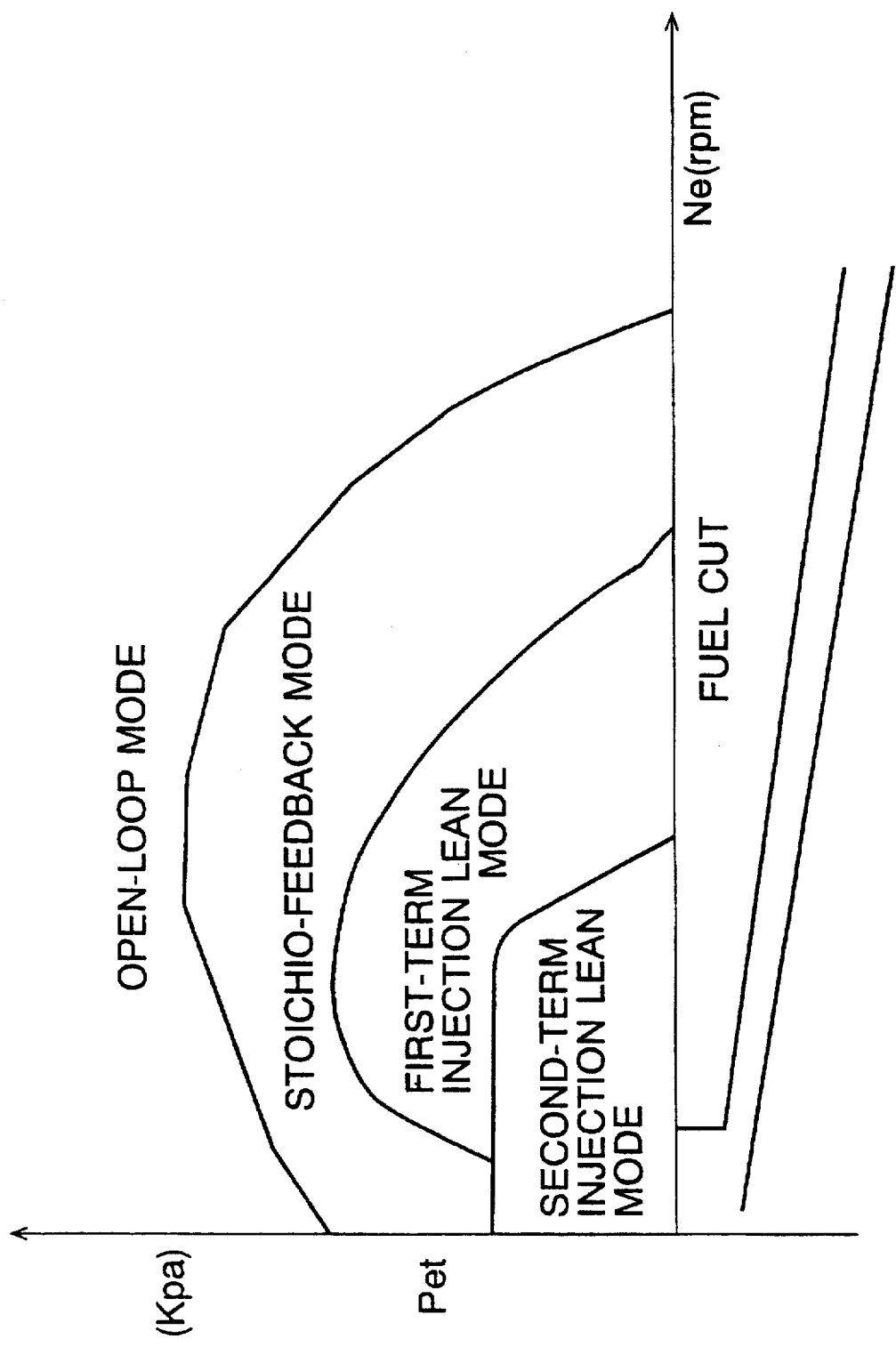
FIG. 2 is a diagram showing a fuel injection control map.

When warm-up of the engine 1 is finished, the ECU 70 retrieves a fuel injection control range at the present time from a fuel injection control map, shown in FIG. 2, in accordance with a target output-related value (e.g., target average effective pressure Pet) obtained from the throttle voltage VTH indicative of the throttle opening θTH, and an engine rotation speed Ne, and determines a fuel injection mode (injection mode selection means). Here, the target average effective pressure Pet can be obtained from throttle voltage VTH and engine rotation speed Ne (Pet=fp(Ne, VTH), for example.

Then, the target air-fuel ratio AFt and target ignition timing Sa in the fuel injection mode at the present time are determined. Further, a fuel injection timing (fuel-injection-amount-related value) corresponding to the target air-fuel ratio AFt is determined, and a fuel injection amount is determined. In accordance with the thus determined fuel injection amount, the fuel injection valve 4 is controlled. At the same time, the ignition coil 19 is controlled. Also, the ECU 70 controls the opening and closing of the #1ABV 24, the #2ABV 27, the EGR valve 45, etc.

In the following, the fuel injection control procedure will be described more specifically.

For example, if the engine operates in a low load range attained at the time of idle operation, low speed running or the like after completion of the warm-up operation, the fuel injection control range at the present time becomes a second-term injection lean range shown in FIG. 2 (a first injection mode). In a broad sense, the second-term injection lean range belongs to a lean air-fuel ratio mode or a first air-fuel ratio mode. In this case, the ECU 70 (first output-related value setting means) selects the second-term injection mode, determines a target air-fuel ratio AFt (output-related value) based on the target average effective pressure Pet and the engine rotation speed Ne (AFt=fA(Ne, Pet)) and controls the #1ABV 24 and #2ABV 27 so as to secure a lean average air-fuel ratio (e.g., 30–40). In actual, the target air-fuel ratio AFt is determined from a target air-fuel ratio AFt setting map which was prepared in advance for every fuel injection mode. Then, the ECU 70 (first fuel-injection-amount-related value setting means) determines a fuel injection time or fuel injection amount which corresponds to the target air-fuel ratio AFt thus determined, and controls the fuel injection valve 4 based on the fuel injection amount, to thereby carry out the fuel injection.

In the in-cylinder injection type engine 1 having the piston 7 formed at its top face with the cavity 8 as described above, the intake airflow introduced from the intake port 13 produces the aforementioned reverse tumbling flow along the cavity 8, so that the fuel sprayed from the fuel injection valve 4 is properly gathered in the vicinity of the spark plug 3. As a result, at the time of ignition, a rich mixture having an air-fuel ratio which is equal or close to or richer than the stoichiometric air-fuel ratio and a lean mixture having a considerably lean air-fuel ratio are charged in layers, with the rich mixture located around the spark plug 3 and the lean mixture located around the rich mixture. Consequently, the in-cylinder injection type engine 1, adequate ignitability to the mixture is ensured even if the mixture has, as a whole, a lean air-fuel ratio.

In the in-cylinder engine 1, therefore, the emission of CO and HC is suppressed to a minimum, thereby improving the fuel efficiency largely.

Usually in this control range, the ECU 70 keeps the EGR valve 45 open. Thus, a large amount of EGR gas (e.g., more than 30%) can be introduced into the combustion chamber 5 so that the emission of NOx can be reduced largely.

In the medium-speed range for constant speed drive or the like, the engine is operated in first-term injection lean range (lean air-fuel ratio mode) or a stoichio-feedback range (stoichiometric air-fuel ratio mode) shown in FIG. 2, depending on engine load state and engine rotation speed Ne. In this case, the ECU 70 selects first-term injection mode, and injects the fuel so as to obtain a predetermined air-fuel ratio.

That is, in the first-term injection lean range (third injection mode, more generally, third air-fuel ratio mode), the ECU 70 sets a target air-fuel ratio AFt so as to become a relatively lean air-fuel ratio (e.g., 20–23). Usually, the target air-fuel ratio AFt is determined in accordance with the intake air amount Qa obtained from the output of the air flow sensor 32 and the engine rotation speed Ne (AFt=AFs=fAS(Ne, Qa). However, in the first-term injection lean range, the target air-fuel ratio AFt may be determined in accordance with the target average effective pressure Pet and the engine rotation speed Ne as in the aforementioned case. Then, the EC 70 determines a fuel injection amount in accordance with the target air-fuel ratio AFt. In this first-term injection lean range, the EGR valve 45 is closed.

On the other hand, in the stoichio-feedback range (second injection mode, more generally, second air-fuel ratio mode), the ECU 70 controls the #ABV 24 in the same manner as in the case of an idle speed control valve of a conventional internal combustion engine. The #2ABV 27 is closed to thereby prevent an excessive rise in the engine output. An air-fuel ratio feedback control is performed in accordance with the output voltage of the $O_2$ sensor 40, with the EGR valve 45 subjected to open/close control. As a result, the target air-fuel ratio AFT is so controlled as to become the stoichiometric air-fuel ratio AFs.

More specifically, in the stoichio-feedback range, the ECU (second output-related value setting means) determines the target air-fuel ratio AFt in accordance with the intake air amount Qa, obtained from the output of the airflow sensor 32, and the engine rotation speed Ne, so as to make the target air-fuel ratio coincide with the stoichiometric air-fuel ratio AFs (AFt=AFs=fAS (Ne, Qa)). Then, the ECU (second fuel-injection-amount-related value setting means) determines a fuel injection time in accordance with the target air-fuel ratio AFt and calculates a fuel injection amount. Further, the fuel injection value 4 concerned is controlled so that fuel injection for the thus calculated fuel injection amount is performed.

Usually, the ECU 70 keeps the EGR valve 45 open in the stoichio-feedback control range, and hence an appropriate amount of EGR gas is introduced into the combustion chamber 5. Thus, as described above, NOx is reduced largely and the fuel efficiency is improved. In this range, a large output is obtained because of a relatively high compression ratio, and at the same time, harmful exhaust gas components are removed adequately by the three-way catalyst 42.

In a high load range attained at the time of sudden acceleration, high-speed traveling and the like, an open-loop control range shown in FIG. 2 is determined. In this case, the ECU 70 selects the first-term injection mode and closes the #2ABV 27. The ECU sets the target air-fuel ration AFt with reference to the map so as to ensure a relatively rich air-fuel ratio, and injects the fuel in accordance with the target air-fuel ratio AFt.

During coasting at a medium or high speed, a fuel cut range shown in FIG. 2 is determined. In this case, the ECU 70 stops the fuel injection, whereby the fuel efficiency is improved, and the emission of the harmful gas components is fully prevented. Meantime, the fuel cut is canceled immediately when the engine rotation speed Ne drops below a restoration speed or when the accelerator pedal is depressed by the driver.

Next, an ignition timing control procedure for the first- and second-term injection modes will be described.

For the ignition timing control, a target ignition timing Sa is first set. Under the second-term injection mode, that is, in the second-term injection lean range shown in FIG. 2, the ECU (first ignition timing setting means) determines the target ignition timing Sa in accordance with the target average effective pressure Pet and the engine rotation speed Ne (Sa=fSL(Ne, Pet). The ignition coil 19 is properly controlled in accordance with the target ignition timing Sa. Under the first-term injection mode, the target ignition timing Sa is determined in accordance with the volumetric efficiency, obtained based on information supplied from the airflow sensor 32, and the engine rotation speed Ne (Sa=fss (Ne, Ev).

When the engine is driven in mainly the second-term lean range, the target average effective pressure Pet and the target air-fuel ratio AFt are set in accordance with throttle voltage VTH from the TPS 29 and the engine rotation speed Ne, as described as to the engine control content, because the target values Pet and AFt highly responsive to the engine operating state and its change can be determined.

However, there is a possibility that the TPS 29 cannot function normally due to vibration of the engine 1, wear of a movable component of the TPS, or the like. If the TPS 29 is in trouble, the target average effective pressure Pet cannot be obtained so that the fuel injection control range cannot be retrieved from the map shown in FIG. 2. In this case, the target ignition timing Sa and the target air-fuel ratio AFt cannot be obtained accurately. Consequently, the ECU 70 cannot control the fuel injection valve 4 and the ignition coil 19.

To obviate such a situation, the control apparatus according to the present embodiment is so constructed that the fuel injection valve 4 and the ignition coil 19 can be controlled continually, even if the TPS 29 is in trouble.

Figure 3:
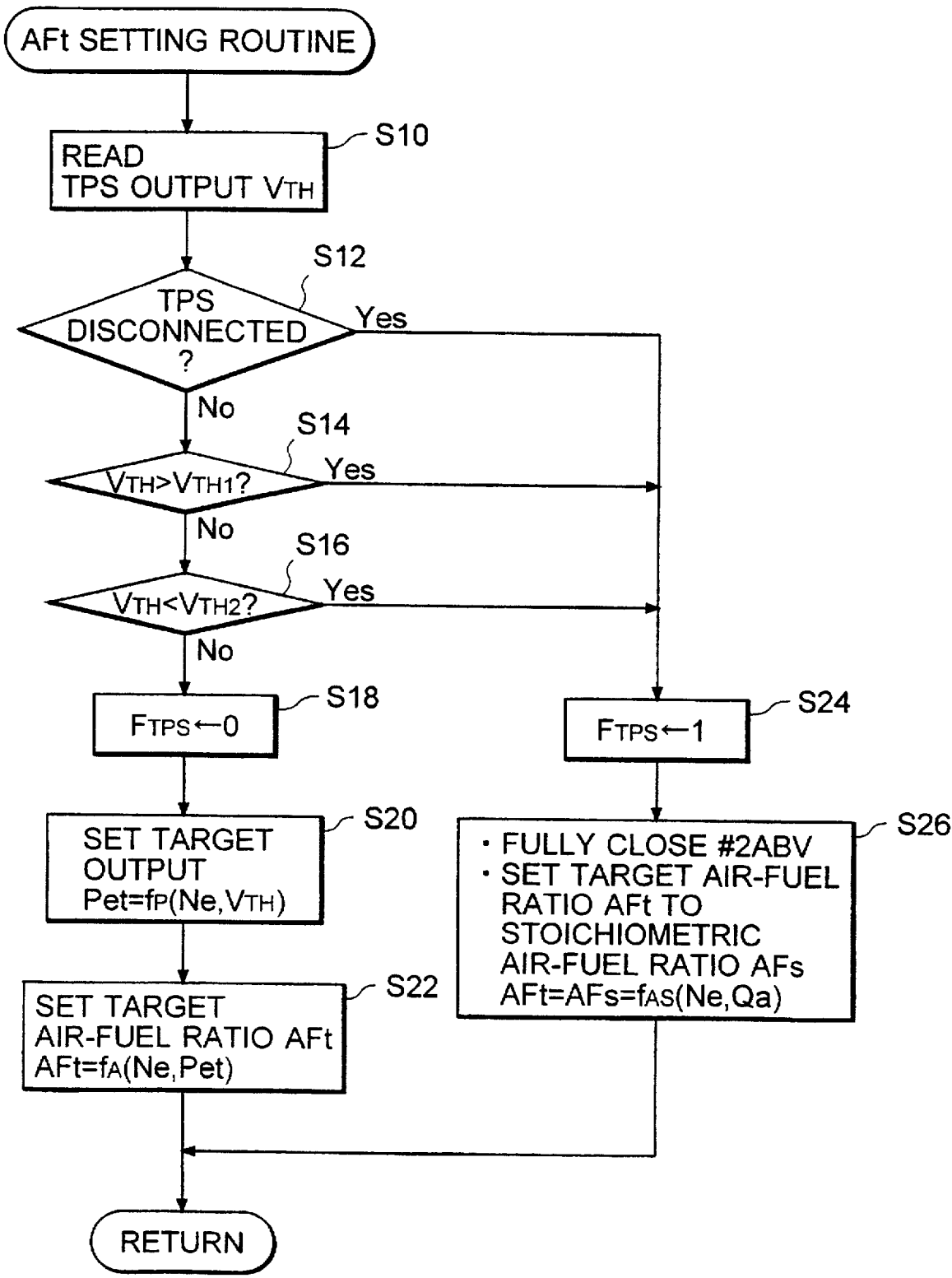
FIG. 3 is a flowchart showing a routine for setting a target air-fuel ratio AFt.
Figure 4:
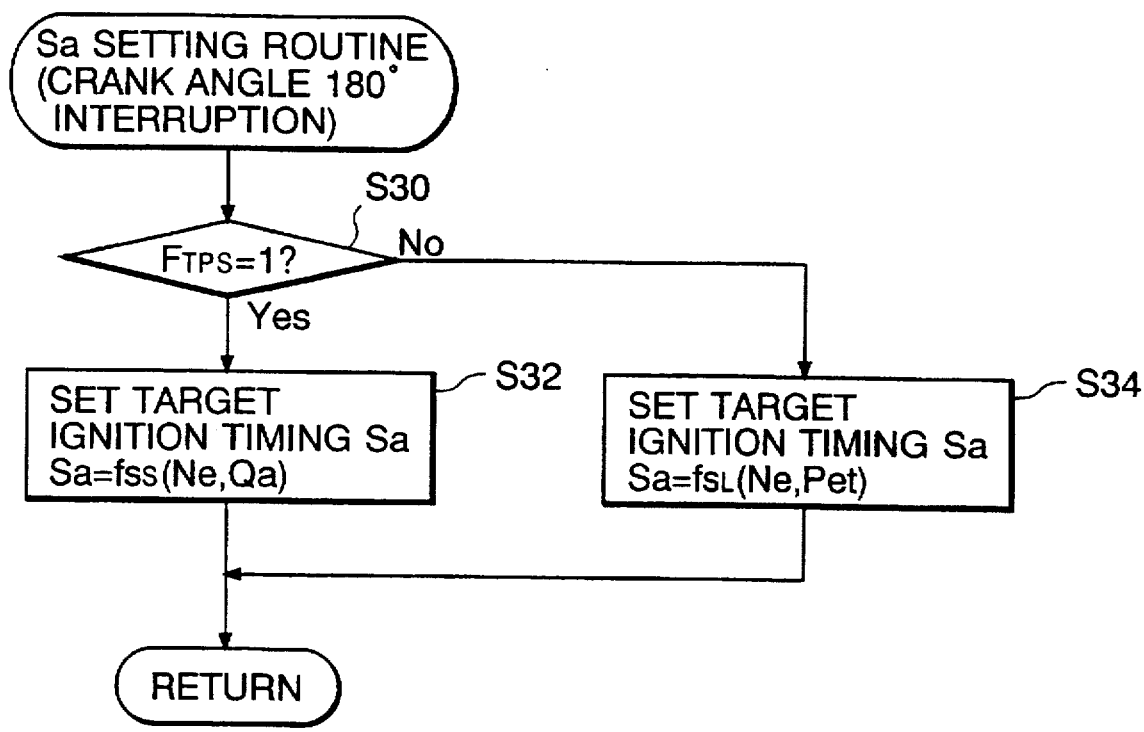
FIG. 4 is a flowchart showing a routine for setting a target ignition timing Sa.

Referring to FIGS. 3 and 4, the procedure to set the target air-fuel ratio AFt and the target ignition timing Sa executed in the control apparatus, taking a trouble of the TPS 29 into account, will be described in detail.

FIGS. 3 and 4 respectively show a target air-fuel ratio AFt setting routine and a target ignition timing Sa setting routine which are executed by the ECU 70 during the engine operation under the second-term injection lean mode.

In step S10 in FIG. 3, the ECU reads a throttle voltage VTH output from the TPS 29.

In step S12, the ECU (failure detecting means) determines whether or not a signal line connecting between the TPS 29 and the ECU 70 is disconnected. For this determination, it is determined whether or not any output signal is delivered from the TPS 29. If the result of determination in step S12 is No, i.e., if a signal is delivered from the TPS 29, then it is determined that the signal line between the TPS 29 and the ECU 90 is not disconnected. In this case, the process proceeds to step S14.

In step S14, the ECU (failure detecting means) determines whether or not the throttle voltage VTH from the TPS 29 exceeds a predetermined value VTH1 (e.g., 4.5 V) corresponding to an allowable maximum value of the throttle voltage VTH which is output when the TPS 29 operates normally. If the result of determination in step S14 is No, it is determined that the throttle voltage VTH is equal to or less than the allowable maximum voltage VTH1 (e.g., 4.5 V), and the process proceeds to step S16.

In step S16, the ECU (failure detecting means) determines whether or not the throttle voltage VTH is less than a predetermined value VTH2 (e.g., 0.5 V) corresponding to an allowable minimum value of the throttle voltage VTH which is output when the TPS is in a normal operation state. If the result of determination in step S16 is No, it is determined that the throttle voltage VTH is equal to or larger than the allowable minimum voltage VTH2 (e.g., 0.5 V), and the process proceeds to step S18.

In step S18, in accordance with the results of determinations, "the line is not disconnected", "VTH is equal to or less than the allowable maximum voltage value" and "VTH is equal to or larger than the allowable minimum voltage value" in the steps S12, S14 and S16, it is determined that the TPS 29 operates normally and a failure flag FTPS is set to a value of 0 indicative of normal operating state. If it is determined that the TPS 29 is in trouble, the flag FTPS is set to a value of 1 indicating that the TPS 29 is faulty.

If the failure flag FTPS is set to the value 0 in step S18, the process proceeds to step S20. Then, the target output, i.e., the target average effective pressure Pet is set in accordance with the engine rotation speed Ne and the throttle voltage VTH, as described above.

In step S22, the ECU (fuel injection control means) sets the target air-fuel ratio AFt in accordance with the engine rotation speed Ne and the target average effective pressure Pet.

On the other hand, if at least any one of the results of determination in the steps S12, S14 and S16 is Yes, the process proceeds to step S24. That is, if the result of determination in step S12 is Yes so that disconnection of the signal line for the TPS29 is determined, or if the result of determination is Yes in step S14 so that a throttle voltage VTH exceeding the allowable maximum value VTH1 (e.g., 4.5 V) which is caused by, e.g., a short-circuit on the power supply side is determined, or if the result of determination is Yes in step S16 so that a throttle voltage VTH less than the allowable minimum value VTH2 (e.g., 0.5 V) which is caused by, e.g., a short-circuit on the grounding side is determined, then it can be estimated that there is any trouble or abnormality in the TPS 29. In this case, the process proceeds to step S24.

In step S24, the failure flag FTPS is set to a value of 1 indicating that the TPS 29 is in trouble, whereby it is memorized that the TPS does not operate normally due to trouble or the like. After the failure flag FTPS is set to the value 1, the process proceeds to step S26.

In step S26, at least the #2ABV 27 is fully closed and the opening of the #1ABV 24 is controlled based on the engine rotation speed Ne or the like in the same manner as in the case of a conventional internal combustion engine. Then, the ECU (fuel injection control means) forcibly sets the target air-fuel ratio AFt to a value equal to or close to the stoichiometric air-fuel ratio AFs, to thereby control the target air-fuel ratio so as to be a substantially stoichiometric air-fuel ratio.

The reason why the #2ABV 27 is fully closed when the TPS 29 is in trouble is that the fuel injection amount is determined depending on the intake air amount Qa as described later. More specifically, in the second-term injection lean region or the first-term injection lean region, a bypass air control is carried out, while a required target intake air amount is ordinarily calculated in accordance with the target air-fuel ratio and the target output, i.e., the fuel injection amount, which is determined based on the engine rotation speed Ne and the throttle voltage VTH. The opening degree of the #2ABV 27 is controlled so that the sum of the air amount sucked through the throttle valve 28 and the #1ABV 24 and the air amount sucked through the #2ABV 27 becomes equal to the calculated target intake air amount. However, if the TPS 29 is faulty, an accurate bypass air amount cannot be set with high response because no accurate throttle voltage VTH is obtainable. At the time of failure of the TPS 29, if an attempt is made to control the opening degree of the #2ABV 27 such that the intake air amount Qa corresponding to the output of the air flow sensor 32 becomes equal to the target intake air amount, an undesired hunting can occur or the opening degree of the #2ABV 27 can be set to an excessively large value since the moving position of the throttle valve 28 always changes in response to a change in the depression amount of the accelerator pedal operated by the driver and the opening degree of the #2ABV 27 entails a control response delay. In consequence, a shock due to a change in engine output can occur or the engine output can increase undesirably, resulting in a degraded derivability, if the opening degree of the #2ABV 27 is controlled based on the intake air amount Qa at the time when the target air-fuel ratio Aft is changed to the stoichiometric air-fuel ratio Afs under the condition that the TPS 29 is faulty. For this reason, it is advisable to stop the control of the opening degree of the #2ABV 27 so that the #2ABV is fully closed.

On the other hand, it is not inevitably necessary to close the #1ABV 24 for the reason that the #1 ABV 24 is small in its passage diameter so that an amount of air flowing therethrough is small. Another reason resides in that the opening degree of the #1ABV 24 is controlled based on the engine rotation speed Ne or the like in the same manner as in the case of the conventional intake-pipe injection type internal combustion engine. However, it is desirable to fully close the #1ABV 24 together with the #2ABV 27 when the TPS 29 is in trouble, if the opening degree of the #1ABV 24 is controlled in accordance with a parameter other than the engine rotation speed Ne.

If the target air-fuel ratio AFt is adjusted to the stoichiometric air-fuel ratio AFs by controlling the #1ABV 24 and #2ABV 27, it is possible to keep the engine 1 in a securely stabilized operating state and maintain a adequate drivability, even if the TPS is in trouble. Further, it is possible to prevent the emission of harmful exhaust gas components because the exhaust gas purification efficiency of the three-way catalyst is the highest under the stoichiometric air-fuel ratio AFs.

In order to adjust the target air-fuel ratio AFt so as to be equal to the stoichiometric air-fuel ratio AFs, it is further necessary to set the fuel injection amount so as attain the stoichiometric air-fuel ratio AFs. However, if the TPS 29 is in trouble, the target average effective pressure Pet and the target air-fuel ratio AFt cannot be obtained in accordance with the throttle voltage VTH supplied from the TPS 29. Thus, if the TPS 29 is in trouble, the target air-fuel ratio AFt is set to the stoichiometric air-fuel ratio in accordance with the engine rotation speed Ne and the intake air amount Qa obtained from the output of the airflow sensor 32 (AFt= AFs=fAS (Ne, Qa)), as in the case of the air-fuel ratio feedback control effected in the stoichio-feedback range. Then, a fuel injection amount is set in accordance with the thus set target air-fuel ratio AFt. As a result, even when the TPS is in trouble, the target air-fuel ratio AFt can be set to a value equal to or close to the stoichiometric air-fuel ratio AFs, to thereby make it possible to control the target air-fuel ratio to an approximate stoichiometric air-fuel ratio.

With reference to FIG. 4, the manner of setting the target ignition timing at the time of the second-term injection lean operation will be described.

Instep S30 in FIG. 4, a determination is made as to whether or not the failure flag F TPS has been set to a value of 1 in the target air-fuel ratio setting routine. That is, whether or not the TPS 29 is in trouble is determined.

If the result of determination in step S30 is Yes, i.e., if the failure flag FTPS has been set to the value 1, it is determined that the TPS 29 is in trouble. In this case, the process proceeds to step S32.

If the TPS 29 is in trouble as described above, the target average effective pressure Pet cannot be obtained in accordance with the throttle voltage VTH supplied from the TPS 29. Thus, in step S32, the ECU (second ignition timing control means) determines the target ignition timing Sa in accordance with the intake air amount Qa, obtained from the output of the airflow sensor 32, and the engine rotation speed Ne (Sa=f ss(Ne, Qa)), as in the case of the target air-fuel ratio AFt.

On the other hand, if the result of determination in step S30 is No, i.e., if the failure flag F TPS is not at a value of 1 but at a value of 0, then it is determined that the TPS 29 operates normally. In this case, the process proceed to step S34 where the ECU (first ignition timing control means) determines, as usual, the target ignition timing Sa from the engine rotation speed Ne and the target average effective pressure Pet which is based on the throttle voltage VTH.

Figure 5:
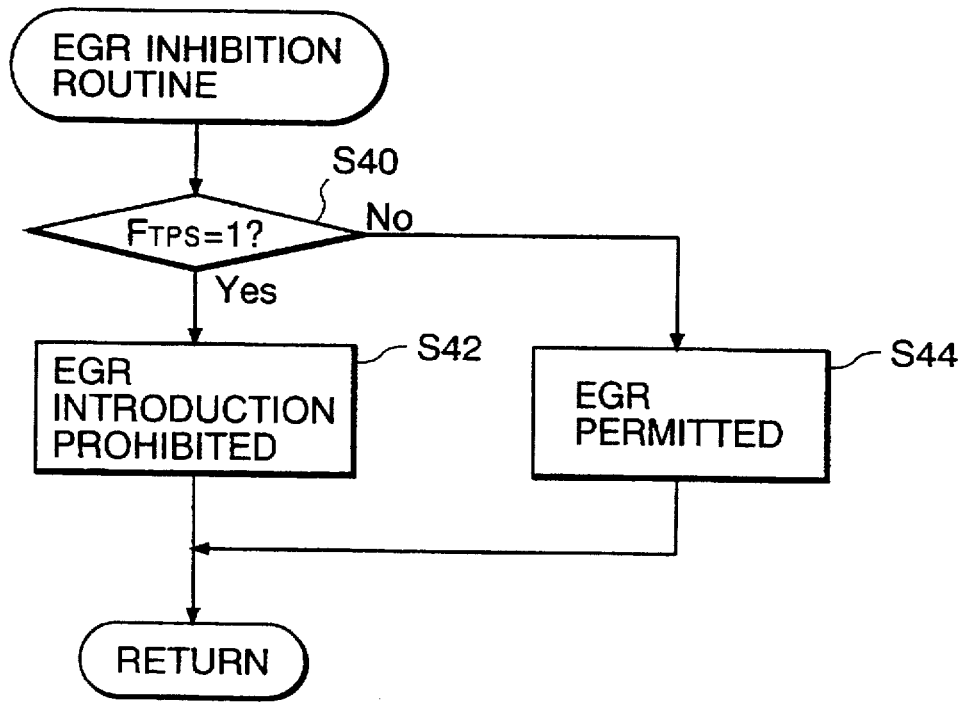
FIG. 5 is a flowchart showing a routine for inhibiting EGR.

As shown in FIG. 5, if the TPS 29 is in trouble, i.e., if the failure flag F TPS is at a value of 1 (step S40), the introduction of EGR gas is inhibited (step S42). That is, if the TPS 29 is in trouble, a priority is given to a stabilized engine operation over an improved fuel efficiency. For this reason, the introduction of the EGR gas is inhibited, while the second-term injection lean operation is inhibited at step S26 in FIG. 3 even though the engine should naturally be operated in the second-term injection lean mode in order to improve the fuel efficiency. As a result, a required amount of fresh intake air is assured, so that a reduction in the fuel amount which would be otherwise caused at the time when the target air-fuel ratio AFt is set to the stoichiometric air-fuel ratio AFs is eliminated, thereby preferably preventing a reduction in the output of the engine 1. On the other hand, if the failure flag F TPS is at a value of 0, i.e., if the TPS 29 operates normally, an EGR gas introduction control is carried out, as usual, in the aforementioned manner (step S44).

As explained in detail in the above, the control apparatus of the present embodiment includes the ECU 70 which serves as the failure detecting means, fuel injection control means, ignition timing control means, injection mode selection means (air-fuel ratio mode selection means), air bypass valve target opening degree setting means, intake air amount control means for controlling the opening degrees of the air bypass valves. The control apparatus operates to variably control the air-fuel ratio, e.g., at the time when the engine is in the second-term injection lean range, by usually determining the target output or the target average effective pressure Pet in accordance with the throttle voltage VTH supplied from the throttle position sensor (TPS) 29, to thereby set the target air-fuel ratio AFt with a good response. At this time, the target ignition timing Sa is also set. On the other hand, if a failure or abnormality in the TPS 29 is detected, the control apparatus operates to forcibly set the target air-fuel ratio AFt so as to be equal to or close to the stoichiometric air-fuel ratio AFs. In addition, the control apparatus operates to determine the target air-fuel ratio AFt or the fuel injection amount and the target ignition timing Sa based on the intake air amount Qa and the engine rotation speed Ne, rather than the output of the TPS 29.

According to the control apparatus of the present embodiment, therefore, even when the TPS 29 is in trouble, a control is carried out so that the target air-fuel ratio AFt becomes equal to a substantially stoichiometric air-fuel ratio, thereby permitting the engine 1 to continue a stabilized operation. As a result, a vehicle mounted with the engine can be continuously driven without deteriorating the derivability, while suppressing the emission of harmful exhaust gas components.

The present invention is not limited to the foregoing embodiment, but may be modified in various ways.

For example, in the embodiment, the target average effective pressure Pet and the target air-fuel ratio AFt are usually obtained in accordance with the output (throttle voltage V TH) from the throttle position sensor (TPS). Alternatively, an accelerator position sensor (indicated by reference numeral 80 in FIG. 1) may be employed as a parameter detecting means. The accelerator position sensor is operable to detect a depression amount of an accelerator pedal (indicated by numeral 81 in FIG. 1) which serves as an engine speed detecting member in place of the TPS 29, and is operable to generate an output indicative of the depression amount (first parameter) of the accelerator pedal. More specifically, the same effect as that of the embodiment can be obtained by setting, in usual, the target air-fuel ratio AFt and the target ignition timing Sa in accordance with an output from the accelerator position sensor (APS), and by obtaining, when the APS is in trouble, the target air-fuel ratio AFt and the target ignition timing Sa in accordance with the intake air amount Qa in a target air-fuel ratio setting routine and a target ignition timing setting routine which are similar to those shown in FIGS. 3 and 4.

In the above embodiment, the air-fuel ratio is controlled to a value equal to or close to the stoichiometric air-fuel ratio when the TPS is in trouble. Alternatively, any one of the first-term injection lean range, stoichio-feedback range and open-loop range, which belong to the first-term injection mode, may be selected when the TPS is faulty so long as the selected mode is one in which the target air-fuel ratio AFt or the like can be set in accordance with the intake air amount information Qa supplied from the airflow sensor 32, and the engine rotation speed Ne. Alternatively, upon occurrence of a failure in the TPS, the engine operation under the second-term injection lean range may be simply prohibited.

Although the in-cylinder injection type 4-cylindered gasoline engine is employed as the engine 1 in the embodiment, the present invention may be applied to any type of engine which can be controlled while changing the target air-fuel ratio AFt. For example, an intake-pipe injection type engine such as a lean burn engine may be employed in which a lean air-fuel ratio can be variably controlled in a wide range.

In the following, a brief explanation as to a case where the present invention is applied to an ordinary lean-burn engine will be given. The lean-burn engine is operable with a rich air-fuel ratio, stoichiometric air-fuel ratio, lean air-fuel ratio and the like. In this case, a stable combustion with stratified-charge can be performed by gathering a rich air-fuel mixture around a spark plug by utilizing a swirl flow or by elaborating a fuel injection system, so that the air-fuel ratio can be variably controlled in a lean air-fuel ratio range (e.g., A/F=18–24). In such a lean-burn engine, the air-fuel ratio and the ignition timing can be set accurately with a good response in accordance with the engine rotation speed Ne and the throttle opening degree θTH which is represented by a throttle voltage VTH supplied from the TPS 29 which is attached to the throttle valve of the engine, whereby the engine is stably operable with a lean air-fuel ratio to thereby improve the fuel efficiency even when the engine is in a stratified-charge state in which the combustion may be unstable if the air-fuel ratio or the injection timing becomes improper. If it is determined that the TPS 29 is in trouble in the lean-burn engine of this kind, the target air-fuel ratio is set to the substantially stoichiometric air-fuel ratio as in the case of the foregoing embodiment, whereby the combustion state in the engine can be stabilized. In this case, the air-fuel ratio can be set in accordance with the intake air amount Qa and the engine rotation speed Ne or in accordance with the output of an exhaust gas sensor such as oxygen sensor.

Figure 6:
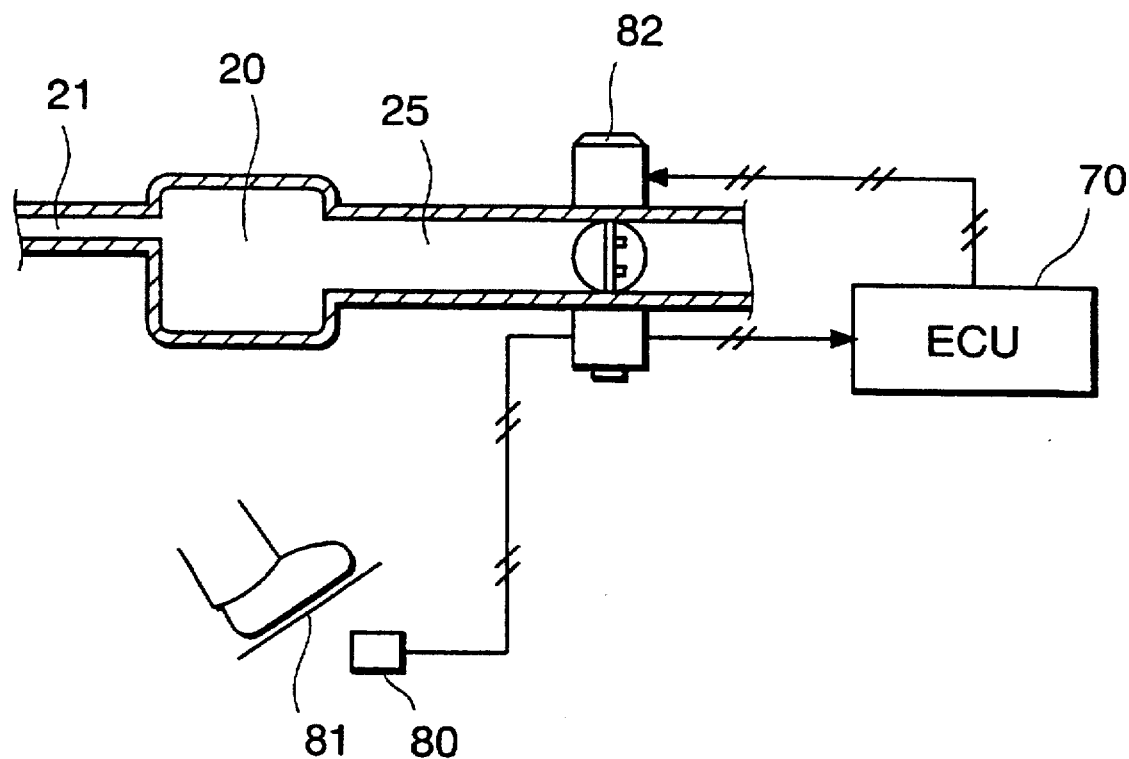
FIG. 6 is a fragmentary block diagram showing an essential part of a control apparatus according to a modification of the present invention.

In the aforementioned lean-burn engine, an accelerator pedal position sensor (hereinafter referred to as APS) 80 may be provided, as shown in FIG. 6, at a location around the accelerator pedal (engine speed adjusting member) 81, instead of the air bypass pipe 26 bypassing the throttle body 23 and the second bypass valve 27 for opening and closing the air bypass pipe which are used in the foregoing embodiment. In this case, an electrically-driven throttle valve 82 is provided in the throttle body, and the opening degree of the throttle valve 82 is controlled by the ECU 70 in accordance with an accelerator pedal voltage VAC and a change thereof, the voltage VAC being output from the APS (parameter detecting means) and indicating an accelerator pedal depression amount θAC (first parameter). Namely, the present invention is applicable to the just-mentioned engine of a drive-by-wire type (hereinafter referred to as DBW) where the opening degree of the electrically-driven throttle valve is controlled depending on the accelerator pedal depression amount.

A DBW type engine may be provided with the TPS 29 at a location around the throttle valve 82. In such an arrangement, the air-fuel ratio and ignition timing can be set accurately with a good response in accordance with the engine rotation speed Ne and a throttle voltage VTH supplied from the TPS 29 and indicative of the throttle opening degree θTH, as in the case of the above embodiment, whereby a stabilized engine operation with a lean air-fuel ratio can be carried out even if the engine operates in a state where a stratified-charge is made and where a unstable combustion is easily caused if the air-fuel ratio or ignition timing is deviated from its proper value.

It is desirable to set the opening degree of the throttle valve to a value larger than a standard opening degree which corresponds to the depression amount of the accelerator pedal, thereby increasing the amount of air intake (intake air amount control means), so as to introduce an amount of intake air necessary to attain a lean air-fuel ratio for the aforementioned lean air-fuel ratio operation of the engine, i.e., for the engine operation in a low- or medium-speed operation range.

In the DBW type engine of this kind, if it is determined that the TPS 29 associated with the throttle valve is in trouble, the opening degree of the throttle valve is controlled so as to be equal to the standard opening degree which corresponds to the depression amount of the accelerator pedal 81, and the target air-fuel ratio is set to a substantially stoichiometric air-fuel ratio. Further, the introduction of intake air necessary for achievement of the lean air-fuel ratio is inhibited, whereby the engine combustion state is advantageously stabilized.

What is claimed is:

1. A control apparatus for an internal combustion engine having a speed adjusting member for engine speed adjustment and a fuel injection device for injecting fuel in suitable quantity to an engine operating state, comprising:

a parameter detecting means for detecting a first parameter indicative of the engine operating state and varying with a change in an operating state of the speed adjusting member and for generating an output indicative of the first parameter thus detected;

a first output-related value setting means for setting a target output-related value, affecting engine operation, in accordance with at least the output of said parameter detecting means;

a second output-related value setting means for setting the target output-related value in accordance with a second parameter, other than the first parameter, indicative of the engine operating state;

a fuel injection control means for controlling the fuel injection device in accordance with the target output-related value set by said first or second output-related value setting means; and a failure detecting means for detecting a failure in said parameter detecting means, wherein said fuel injection control means controls the fuel injection device in accordance with mainly the target output-related value set by said first output-related value setting means when no failure in said parameter detecting means is detected by said failure detecting means; and wherein said fuel injection control means controls the fuel injection device in accordance with the target output-related value set by said second output-related value setting means when a failure in said parameter detecting means is detected by said failure detecting means.

2. The control apparatus according to claim 1, wherein said second output-related value setting means uses intake air amount or exhaust gas component as the second parameter.

3. The control apparatus according to claim 2, further comprising:

an intake air amount detecting means for detecting an amount of intake air introduced into a combustion chamber of the internal combustion engine and for generating an output indicative of the amount of intake air thus detected, wherein said second output-related value setting means uses at least the output of said intake air amount detecting means, as the second parameter.

4. The control apparatus according to claim 2, further comprising:

an exhaust gas sensor provided in an exhaust passage of the internal combustion engine for detecting an exhaust gas component and for generating an output indicative of the exhaust gas component thus detected, wherein said second output-related value setting means uses the output of said exhaust gas sensor as the second parameter.

5. The control apparatus according to claim 1, further comprising:

a first ignition timing setting means for setting a target ignition timing in accordance with at least the output of said parameter detecting means;

a second ignition timing setting means for setting the target ignition timing in accordance with the second parameter; and an ignition timing control means for controlling a spark plug in accordance with the target ignition timing set by said first or second ignition timing setting means, said spark plug being provided in the internal combustion engine for igniting fuel supplied to a combustion chamber of the internal combustion engine, wherein said ignition timing control means controls the spark plug in accordance with mainly the target ignition timing set by said first ignition timing setting means when no failure in said parameter detecting means is detected by said failure detecting means, and wherein said ignition timing control means controls the spark plug in accordance with the target ignition timing set by said second ignition timing setting means when a failure in said parameter detecting means is detected by said failure detecting means.

6. The control apparatus according to claim 1, wherein said second output-related value setting means sets the target output-related value to such a value as to make a target air-fuel ratio substantially equal to a stoichiometric air-fuel ratio.

7. The control apparatus according to claim 1, wherein the target output-related value is a target air-fuel ratio, or a required fuel injection amount for achieving the target air-fuel ratio, or a driving time of the fuel injection device corresponding to the required fuel injection amount.

8. The control apparatus according to claim 7, further comprising:

an air-fuel ratio mode selecting means for selecting, in accordance with at least the output of said parameter detecting means, either a first air-fuel ratio mode where the target air-fuel ratio serving as the target output-related value is set to a lean air-fuel ratio or a second air-fuel ratio mode where the target air-fuel ratio is set to a substantially stoichiometric air-fuel ratio, wherein said fuel injection amount control means controls the fuel injection device in accordance with the target air-fuel ratio set by said first output-related value setting means when the first air-fuel ratio mode is selected by said air-fuel ratio mode selecting means, and wherein said fuel injection amount control means controls the fuel injection device in accordance with the target air-fuel ratio set by said second output-related value setting means when the second air-fuel ratio mode is selected.

9. The control apparatus according to claim 8, further comprising:

a first ignition timing setting means for setting a target ignition timing in accordance with at least the output of said parameter detecting means when the first air-fuel ratio mode is selected by said air-fuel ratio mode selecting means;

a second ignition timing setting means for setting the target ignition timing in accordance with the second parameter, when the second air-fuel ratio mode is selected; and an ignition timing control means for controlling a spark plug in accordance with the target ignition timing set by said first or second ignition timing setting means, said spark plug being provided in the internal combustion engine for igniting fuel supplied to a combustion chamber of the internal combustion engine.

10. The control apparatus according to claim 9, wherein said ignition timing control means controls the spark plug in accordance with the target ignition timing set by said first ignition timing setting means, when no failure in said parameter detecting means is detected by said failure detecting means, and wherein said ignition timing control means controls the spark plug in accordance with the target ignition timing set by said second ignition timing setting means when a failure in said parameter detecting means is detected by said failure detecting means.

11. The control apparatus according to claim 8, wherein said air-fuel ratio mode selecting means selects the second air-fuel ratio mode when a failure in said parameter detecting means is detected by said failure detecting means.

12. The control apparatus according to claim 8, further comprising:

an intake air amount control means for controlling an amount of intake air introduced into a combustion chamber of the internal combustion engine, wherein said intake air amount control means controls the amount of intake air in accordance with the output of said parameter detecting means when the first air-fuel ratio mode is selected by said air-fuel ratio mode selecting means, and wherein said intake air amount control means stops controlling the amount of intake air when the second air-fuel ratio mode is selected.

13. The control apparatus according to claim 12, wherein said intake air amount control means includes: an electrically-driven air bypass valve for opening and closing an air bypass passage which is formed, bypassing a first throttle valve, in an intake passage of the internal combustion engine and through which upstream and downstream sides, with respect to the first throttle valve, of the intake passage are communicated with each other, said air bypass passage having a sectional area thereof falling within a range between about one-half a sectional area of the intake passage and the sectional area of the intake passage; and a target opening degree setting means for setting a first target opening degree in accordance with the output of said parameter detecting means, wherein said intake air amount control means controls an opening degree of said air bypass valve to the first target opening degree when the first air-fuel ratio mode is selected by said air-fuel ratio mode selecting means, and said intake air controlling means stops a control, performed based on the first opening degree, of the opening degree of said air bypass valve when the second air-fuel ratio mode is selected.

14. The control apparatus according to claim 13, wherein said intake air controlling means stops the control, performed based on the first target opening degree, of the opening degree of said air bypass valve when a failure in said parameter detecting means is detected by said failure detecting means.

15. The control apparatus according to claim 12, further comprising:

a pedal depression amount detecting means for detecting a depression amount of an accelerator pedal and for generating an output indicative of the thus detected depression amount of the accelerator pedal, said accelerator pedal being provided as the speed adjusting member in a vehicle on which the internal combustion engine is mounted and being operable by a driver, wherein said intake air amount control means sets a second target opening degree in accordance with the output of said pedal depression amount detecting means, obtains a correction value based on the second target opening degree, and controls an opening degree of an electrically-driven second throttle valve to a corrected opening degree obtained by adding the correction value to the second opening degree, when the first air-fuel ratio mode is selected by said air-fuel ratio mode selecting means, said second throttle valve being operable to open and close an intake passage of the internal combustion engine, and wherein said intake air amount control means sets the second opening degree in accordance with the output of said depression amount detecting means and controls the opening degree of said second throttle valve to the thus set second target opening degree, when the second air-fuel ratio mode is selected or when a failure in said parameter detecting means is detected by said failure detecting means.

16. The control apparatus according to claim 8, wherein the internal combustion engine includes a combustion chamber, an exhaust system, and an exhaust gas recirculation device for introducing exhaust gas from the exhaust system into the combustion chamber, and wherein said air-fuel ratio mode selecting means selects the second air-fuel ratio mode and said exhaust gas recirculation device stops an introduction of the exhaust gas, when a failure in said parameter detecting means is detected by said failure detecting means.

17. The control apparatus according to claim 8, wherein said air-fuel ratio mode selecting means is operable to select a third air-fuel ratio mode in which the target air-fuel ratio is set to a predetermined air-fuel ratio between the lean air-fuel ratio relating to the first air-fuel ratio mode and the substantially stoichiometric air-fuel ratio relating to the second air-fuel ratio mode.

18. The control apparatus according to claim 17, wherein said air-fuel ratio mode selecting means selects the second or third air-fuel ratio mode, and said fuel injection control means controls the fuel injection device so that the target air-fuel ratio becomes the substantially stoichiometric air-fuel ratio relating to the second air-fuel ratio mode or the predetermined air-fuel ratio relating to the third air-fuel ratio mode, when a failure in said parameter detecting means is detected by said failure detecting means.

19. The control apparatus according to claim 7, further comprising:

an injection mode selecting means for selecting, in accordance with at least the output of said parameter detecting means, either a first injection mode in which the target air-fuel ratio, serving as the target output-related value, is set to a lean air-fuel ratio or a second injection mode in which the target air-fuel ratio is set to a substantially stoichiometric air-fuel ratio, wherein the fuel injection device is arranged to inject the fuel directly into a combustion chamber of the internal combustion engine, wherein said fuel injection amount controlling means controls the fuel injection device, so as to inject the fuel mainly in a compression stroke of the internal combustion engine in accordance with the target air-fuel ratio set by said first output-related value setting means when the first injection mode is selected by said injection mode selecting means, and wherein said fuel injection amount controlling means controls the fuel injection device, so as to inject the fuel mainly in intake stroke of the internal combustion engine in accordance with the target air-fuel ratio set by said second output-related value setting means when the second injection mode is selected.

20. The control apparatus according to claim 19, wherein said injection mode selecting means selects the second injection mode when said failure detecting means detects a failure in said parameter detecting means.

21. The control apparatus according to claim 19, further comprising:

an intake air amount control means for controlling an amount of intake air introduced into a combustion chamber of the internal combustion engine, wherein said intake air amount control means controls the amount of intake air in accordance with the output of said parameter detecting means when the first injection mode is selected by said injection mode selecting means, and wherein said intake air amount control means stops controlling the amount of intake air when the second injection mode is selected.

22. The control apparatus according to claim 21, wherein said intake air amount control means includes: an electrically-driven air bypass valve for opening and closing an air bypass passage which is formed, bypassing a first throttle valve, in an intake passage of the internal combustion engine and through which upstream and downstream sides, with respect to the first throttle valve, of the intake passage are communicated with each other, said air bypass passage having a sectional area thereof falling within a range between about one-half a sectional area of the intake passage and the sectional area of the intake passage; and a target opening degree setting means for setting a first target opening degree in accordance with the output of said parameter detecting means, wherein said intake air amount control means controls an opening degree of said air bypass valve to the first target opening degree when the first air-fuel ratio mode is selected by said injection mode selecting means, and wherein said intake air controlling means stops a control, performed based on the first opening degree, of the opening degree of said air bypass valve when the second injection mode is selected.

23. The control apparatus according to claim 22, wherein said intake air controlling means stops the control, performed based on the first target opening degree, of the opening degree of said air bypass valve when a failure in said parameter detecting means is detected by said failure detecting means.

24. The control apparatus according to claim 21, further comprising:

a pedal depression amount detecting means for detecting a depression amount of an accelerator pedal and for generating an output indicative of the thus detected depression amount of the accelerator pedal, said accelerator pedal being provided as the speed adjusting member in a vehicle on which the internal combustion engine is mounted and being operable by a driver, wherein said intake air amount control means sets a second target opening degree in accordance with the output of said pedal depression amount detecting means, obtains a correction value based on the second target opening degree, and controls an opening degree of an electrically-driven second throttle valve to a corrected opening degree obtained by adding the correction value to the second opening degree, when the first injection mode is selected by said injection mode selecting means, said second throttle valve being operable to open and close an intake passage of the internal combustion engine, and wherein said intake air amount control means sets the second opening degree in accordance with the output of said depression amount detecting means and controls the opening degree of said second throttle valve to the thus set second target opening degree, when the second injection mode is selected or when a failure in said parameter detecting means is detected by said failure detecting means.

25. The control apparatus according to claim 19, wherein the internal combustion engine includes a combustion chamber, an exhaust system, and an exhaust gas recirculation device for recirculating exhaust gas from the exhaust system to the combustion chamber, and wherein said injection mode selecting means selects the second injection mode, and the exhaust gas recirculation device stops recirculating the exhaust gas, when said failure detecting means detects a failure in said parameter detecting means.

26. The control apparatus according to claim 19, wherein said injection mode selecting means is operable to select a third injection mode in which the target air-fuel ratio is set to a predetermined air-fuel ratio between the lean air-fuel ratio relating to the first injection mode and the substantially stoichiometric air-fuel ratio relating to the second injection mode and in which the fuel injection is carried out mainly in an intake stroke of the internal combustion engine.

27. The control apparatus according to claim 26, wherein said injection mode selecting means selects the second or third injection mode, and said fuel injection control means controls the fuel injection device so that the target air-fuel ratio becomes the substantially stoichiometric air-fuel ratio relating to the second injection mode or the predetermined air-fuel ratio relating to the third injection mode, when a failure in said parameter detecting means is detected by said failure detecting means.

28. The control apparatus according to claim 1, wherein said parameter detecting means is comprised of a pedal depression amount detecting means for detecting a depression amount, as the first parameter, of an accelerator pedal and for generating an output indicative of the accelerator depression amount thus detected, said accelerator pedal being mounted, as the speed adjusting member, in a vehicle on which the internal combustion engine is mounted, and being operable by a driver, or the parameter detecting means is comprised of a throttle valve opening degree detecting means for detecting an opening degree, as the first parameter, of a throttle valve and for generating an output indicative of the thus detected opening degree of the throttle valve, said throttle valve being provided in an intake passage of the internal combustion engine and being operable in association with or independently of an operation of the accelerator pedal.

* * * * *